United States Patent
Reed et al.

(10) Patent No.: US 7,580,691 B1
(45) Date of Patent: Aug. 25, 2009

(54) SYSTEM AND METHOD FOR REDUCING SELF INTERFERENCE

(75) Inventors: David Reed, Westminster, CO (US); Baker Scott, Boulder, CO (US)

(73) Assignee: RF Micro Devices, Inc., Greensboro, NC (US)

( * ) Notice: Subject to any disclaimer, the term of this patent is extended or adjusted under 35 U.S.C. 154(b) by 422 days.

(21) Appl. No.: 11/195,275

(22) Filed: Aug. 2, 2005

(51) Int. Cl.
*H04B 1/06* (2006.01)

(52) U.S. Cl. .............. 455/260; 455/240; 455/296; 375/327; 331/19

(58) Field of Classification Search .......... 455/182.1, 455/182.2, 192.1, 192.2, 255–260, 232.1, 455/240.1, 250.1, 285, 296, 302; 375/322, 375/324, 327, 316, 345, 346; 331/16, 18, 331/19
See application file for complete search history.

(56) References Cited

U.S. PATENT DOCUMENTS

| | | | |
|---|---|---|---|
| 4,450,411 A * | 5/1984 | Spurr ..................... 330/2 |
| 5,079,526 A * | 1/1992 | Heck ..................... 332/127 |
| 5,150,078 A * | 9/1992 | Yang et al. ................. 331/2 |
| 7,020,444 B2 * | 3/2006 | Shinbo et al. .............. 455/76 |
| 2003/0119461 A1 * | 6/2003 | Hirano et al. ............ 455/118 |
| 2004/0166815 A1 * | 8/2004 | Maligeorgos et al. ...... 455/73 |
| 2005/0096004 A1 * | 5/2005 | Tso et al. ................. 455/334 |
| 2006/0014513 A1 * | 1/2006 | Uozumi et al. ........... 455/323 |
| 2006/0057992 A1 * | 3/2006 | Chien et al. ............. 455/258 |
| 2006/0057995 A1 * | 3/2006 | Chien ...................... 455/260 |
| 2007/0054629 A1 * | 3/2007 | Maligeorgos et al. ..... 455/88 |

* cited by examiner

*Primary Examiner*—Nhan T Le
(74) *Attorney, Agent, or Firm*—Withrow & Terranova, P.L.L.C.

(57) ABSTRACT

A system for reducing self interference in a mobile terminal is provided. In general, the system includes a receiver including downconversion circuitry that converts a received radio frequency (RF) signal to a downconverted signal using one or more local oscillator frequencies. The downconverted signal is processed by digital circuitry clocked by one or more clock signals to obtain information from the RF signal. The local oscillator frequencies are provided by a frequency synthesizer as a function of an output frequency signal of a phase lock loop. Divider circuitry operates to divide the output frequency signal of the phase lock loop to provide the clock signals.

21 Claims, 8 Drawing Sheets

| Fc | F$_{VCO}$ | F$_{LO1}$ | F$_{IF}$ | F$_{LO2}$ | CLK1 | CLK2 |
|---|---|---|---|---|---|---|
| | | N3=1 | | N4=3 | N1=7 | N2=89 |
| 2412.0 | 3618.0 | 3618.0 | 1206.0 | 1206.0 | 516.9 | 40.7 |
| 2417.0 | 3625.5 | 3625.5 | 1208.5 | 1208.5 | 517.9 | 40.7 |
| 2422.0 | 3633.0 | 3633.0 | 1211.0 | 1211.0 | 519.0 | 40.8 |
| 2427.0 | 3640.5 | 3640.5 | 1213.5 | 1213.5 | 520.1 | 40.9 |
| 2432.0 | 3648.0 | 3648.0 | 1216.0 | 1216.0 | 521.1 | 41.0 |
| 2437.0 | 3655.5 | 3655.5 | 1218.5 | 1218.5 | 522.2 | 41.1 |
| 2442.0 | 3663.0 | 3663.0 | 1221.0 | 1221.0 | 523.3 | 41.2 |
| 2447.0 | 3670.5 | 3670.5 | 1223.5 | 1223.5 | 524.4 | 41.2 |
| 2452.0 | 3678.0 | 3678.0 | 1226.0 | 1226.0 | 525.4 | 41.3 |
| 2457.0 | 3685.5 | 3685.5 | 1228.5 | 1228.5 | 526.5 | 41.4 |
| 2462.0 | 3693.0 | 3693.0 | 1231.0 | 1231.0 | 527.6 | 41.5 |
| 2467.0 | 3700.5 | 3700.5 | 1233.5 | 1233.5 | 528.6 | 41.6 |
| 2472.0 | 3708.0 | 3708.0 | 1236.0 | 1236.0 | 529.7 | 41.7 |
| 2484.0 | 3726.0 | 3726.0 | 1242.0 | 1242.0 | 532.3 | 41.9 |

*FIG. 6A*

| Fc | CLOSEST HARMONIC OF BB CLOCK (CLK2) | | | | | CLOSEST HARMONICS OF ADC CLOCK (CLK1) | | | | |
|---|---|---|---|---|---|---|---|---|---|---|
| | TO $F_{IF}$ | | TO Fc | | CLOSEST | TO $F_{IF}$ | | TO Fc | | CLOSEST |
| | 29th | 30th | 59th | 60th | | 2nd | 3rd | 4th | 5th | |
| 2412.0 | 1178.9 | 1219.6 | 2398.4 | 2439.1 | 13.6 | 1033.7 | 1550.6 | 2067.4 | 2584.3 | 172.3 |
| 2417.0 | 1181.3 | 1222.1 | 2403.4 | 2444.2 | 13.6 | 1035.9 | 2553.8 | 2071.7 | 2589.6 | 172.6 |
| 2422.0 | 1183.8 | 1224.6 | 2408.4 | 2449.2 | 13.6 | 1038.0 | 1557.0 | 2076.0 | 2595.0 | 173.0 |
| 2427.0 | 1186.2 | 1227.1 | 2413.4 | 2454.3 | 13.6 | 1040.1 | 1560.2 | 2080.3 | 2600.4 | 173.4 |
| 2432.0 | 1188.7 | 1229.7 | 2418.3 | 2459.3 | 13.7 | 1042.3 | 1563.4 | 2084.6 | 2605.7 | 173.7 |
| 2437.0 | 1191.1 | 1232.2 | 2423.3 | 2464.4 | 13.7 | 1044.4 | 1566.6 | 2088.9 | 2611.1 | 174.1 |
| 2442.0 | 1193.6 | 1234.7 | 2428.3 | 2469.4 | 13.7 | 1046.6 | 1569.9 | 2093.1 | 2616.4 | 174.4 |
| 2447.0 | 1196.0 | 1237.2 | 2433.3 | 2474.5 | 13.7 | 1048.7 | 1573.1 | 2097.4 | 2621.8 | 174.8 |
| 2452.0 | 1198.4 | 1239.8 | 2438.2 | 2479.6 | 13.8 | 1050.9 | 1576.3 | 2101.7 | 2627.1 | 175.1 |
| 2457.0 | 1200.9 | 1242.3 | 2443.2 | 2484.6 | 13.8 | 1053.0 | 1579.5 | 2106.0 | 2632.5 | 175.5 |
| 2462.0 | 1203.3 | 1244.8 | 2448.2 | 2489.7 | 13.8 | 1055.1 | 1582.7 | 2110.3 | 2637.9 | 175.9 |
| 2467.0 | 1205.8 | 1247.4 | 2453.1 | 2494.7 | 13.9 | 1057.3 | 1585.9 | 2114.6 | 2643.2 | 176.2 |
| 2472.0 | 1208.2 | 1249.9 | 2458.1 | 2499.8 | 13.9 | 1059.4 | 1589.1 | 2118.9 | 2648.6 | 176.6 |
| 2484.0 | 1214.1 | 1256.0 | 2470.0 | 2511.9 | 14.0 | 1064.6 | 1596.9 | 2129.1 | 2661.4 | 177.4 |

*FIG. 6B*

| | Fc | F$_{VCO}$ | F$_{LO1}$ | F$_{IF}$ | F$_{LO2}$ | CLK1 | CLK2 |
|---|---|---|---|---|---|---|---|
| SUBSET 1 DIVIDE VALUES | | | N3=1 | | N4=3 | N1=7 | N2=89 |
| SUBSET 1 | 4920.0 | 3690.0 | 3690.0 | 1230.0 | 1230.0 | 527.1 | 40.5 |
| | ⋮ | ⋮ | ⋮ | ⋮ | ⋮ | ⋮ | ⋮ |
| | 5080.0 | 3810.0 | 3810.0 | 1270.0 | 1270.0 | 544.3 | 41.9 |
| SUBSET 2 DIVIDE VALUES | | | N3=1 | | N4=3 | N1=7 | N2=95 |
| SUBSET 2 | 5170.0 | 3877.5 | 3877.5 | 1292.5 | 1292.5 | 553.9 | 40.8 |
| | ⋮ | ⋮ | ⋮ | ⋮ | ⋮ | ⋮ | ⋮ |
| | 5320.0 | 3990.0 | 3990.0 | 1330.0 | 1330.0 | 570.0 | 42.0 |
| SUBSET 3 DIVIDE VALUES | | | N3=1 | | N4=3 | N1=8 | N2=101 |
| SUBSET 3 | 5500.0 | 4125.0 | 4125.0 | 1375.0 | 1375.0 | 515.6 | 40.8 |
| | ⋮ | ⋮ | ⋮ | ⋮ | ⋮ | ⋮ | ⋮ |
| | 5700.0 | 4275.0 | 4275.0 | 1425.0 | 1425.0 | 534.4 | 42.3 |
| SUBSET 4 DIVIDE VALUES | | | N3=1 | | N4=3 | N1=8 | N2=106 |
| SUBSET 4 | 5745.0 | 4308.8 | 4308.8 | 1436.3 | 1436.3 | 538.6 | 40.6 |
| | ⋮ | ⋮ | ⋮ | ⋮ | ⋮ | ⋮ | ⋮ |
| | 5920.0 | 4440.0 | 4440.0 | 1480.0 | 1480.0 | 555.0 | 41.9 |

*FIG. 7A*

| | Fc | CLOSEST HARMONIC OF BB CLOCK (CLK2) | | | | | CLOSEST HARMONICS OF ADC CLOCK (CLK1) | | | | | | | CLOSEST |
|---|---|---|---|---|---|---|---|---|---|---|---|---|---|---|
| | | TO F_IF | | TO Fc | | CLOSEST | TO F_IF | | TO Fc | | | | | |
| | | 30th | 31st | 121st | 122nd | | 2nd | 3rd | 8th | 9th | 10th | 11th | | |
| SUBSET 1 | 4920.0 | 1216.5 | 1257.0 | 4906.5 | 4947.0 | 13.5 | 1054.3 | 1581.4 | 4217.1 | 4744.3 | 5271.4 | ... | 175.7 |
| | ... | ... | ... | ... | ... | ... | ... | ... | ... | ... | ... | ... | ... |
| | 5080.0 | 1256.0 | 1297.9 | 5066.0 | 5107.9 | 14.0 | 1088.6 | 1632.9 | 4354.3 | 4898.6 | 5442.9 | ... | 181.4 |
| | ... | 31st | 32nd | 126th | 127th | | 2nd | 3rd | 8th | 9th | 10th | 11th | |
| SUBSET 2 | 5170.0 | 1265.3 | 1306.1 | 5142.8 | 5183.6 | 13.6 | 1107.9 | 1661.8 | 4431.4 | 4985.4 | 5539.3 | ... | 184.6 |
| | ... | ... | ... | ... | ... | ... | ... | ... | ... | ... | ... | ... | ... |
| | 5320.0 | 1302.0 | 1344.0 | 5292.0 | 5334.0 | 14.0 | 1140.0 | 1710.0 | 4560.0 | 5130.0 | 5700.0 | ... | 190.0 |
| | ... | 33rd | 34th | 134th | 135th | | 2nd | 3rd | 8th | 9th | 10th | 11th | |
| SUBSET 3 | 5500.0 | 1347.8 | 1388.6 | 5472.8 | 5513.6 | 13.6 | 1031.3 | 1546.9 | 4125.0 | 4640.6 | 5156.3 | 5671.9 | 171.9 |
| | ... | ... | ... | ... | ... | ... | ... | ... | ... | ... | ... | ... | ... |
| | 5700.0 | 1396.8 | 1439.1 | 5671.8 | 5714.1 | 14.1 | 1068.8 | 1603.1 | 4275.0 | 4809.4 | 5343.8 | 5878.1 | 178.1 |
| | ... | 35th | 36th | 141st | 142nd | | 2nd | 3rd | 8th | 9th | 10th | 11th | |
| SUBSET 4 | 5745.0 | 1422.7 | 1463.3 | 5731.5 | 5772.1 | 13.5 | 1077.2 | 1615.8 | 4308.8 | 4847.3 | 5385.9 | 5924.5 | 179.5 |
| | ... | ... | ... | ... | ... | ... | ... | ... | ... | ... | ... | ... | ... |
| | 5920.0 | 1466.0 | 1507.9 | 5906.0 | 5947.9 | 14.0 | 1110.0 | 1665.0 | 4440.0 | 4995.0 | 5550.0 | 6105.0 | 185.0 |

*FIG. 7B*

SYSTEM AND METHOD FOR REDUCING SELF INTERFERENCE

FIELD OF THE INVENTION

The present invention relates to a system for reducing self interference in a mobile terminal, and more particularly relates to a system having one or more walking clock signals.

BACKGROUND OF THE INVENTION

When integrating a radio frequency (RF) transceiver, which has a number of analog components, and digital circuitry, such as analog-to-digital converters (ADCs), a control system, and the like, harmonics of the clock signals for the digital circuitry create interference which may fall within a bandwidth of the RF transceiver and degrade system performance. Further, RF transceivers are typically capable of operating in a frequency band having a number of frequency channels. In many cases, the frequency band is large enough that several harmonics of the clock signal fall within the frequency band and interfere with channels within the frequency band. For example, if the RF transceiver is operating in the 2.4 GHz band according to 802.11b, the frequency band may be 2412.0 MHz-2484.0 MHz. If the clock signal is at 40 MHz, then the 60th-62nd harmonics are at 2400 MHz, 2440 MHz, 2480 MHz and will interfere with channels within the frequency band.

Thus, there remains a need for a system that reduces self interference between analog components of an RF transceiver and digital circuitry.

SUMMARY OF THE INVENTION

The present invention provides a system for reducing self interference in a mobile terminal. In general, the system includes a receiver including downconversion circuitry that converts a received radio frequency (RF) signal to a downconverted signal using one or more local oscillator frequencies. The downconverted signal is processed by digital circuitry clocked by one or more clock signals to obtain information from the RF signal. A phase lock loop generates an output frequency signal, and the local oscillator frequencies are provided as a function of the output frequency signal. Divider circuitry operates to divide the output frequency signal of the phase lock loop to provide the clock signals. Thus, as a frequency of the output frequency signal of the phase lock loop, and thus the channel of the mobile terminal, changes, a frequency of the clock signals also changes.

Divide values for the divider circuitry are provided such that the harmonics of the clock signals are offset from a center frequency of the RF signal by at least a minimum offset. Since both the local oscillator frequencies and the clock signals are related to the output frequency signal of the phase lock loop, as the output frequency signal of the phase lock loop is tuned to select a desired frequency channel, the frequencies of the clock signals also change. In one embodiment, the change in the frequency of the clock signals is such that an offset between a nearest harmonic of each of the clock signals to the center frequency of the received signal remains substantially unchanged.

In one embodiment, the digital circuitry includes an analog-to-digital converter that digitizes the downconverted signal to provide a digital signal and processing circuitry that processes the digital signal to obtain the information originally transmitted in the RF signal. The analog-to-digital converter is clocked by a first of the clock signals, and the baseband processor is clocked by a second of the clock signals. The divider circuitry includes a first divider that divides the output frequency signal of the phase lock loop by a first divide value to provide the first clock signal. The divider circuitry also includes a second divider that divides the output frequency signal by a second divide value to provide the second clock signal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 6A-6B are tables illustrating an exemplary frequency plan for the frequency synthesizer according to one embodiment of the present invention; and FIGS. 7A-7B are tables illustrating a second exemplary frequency plan for the frequency synthesizer according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
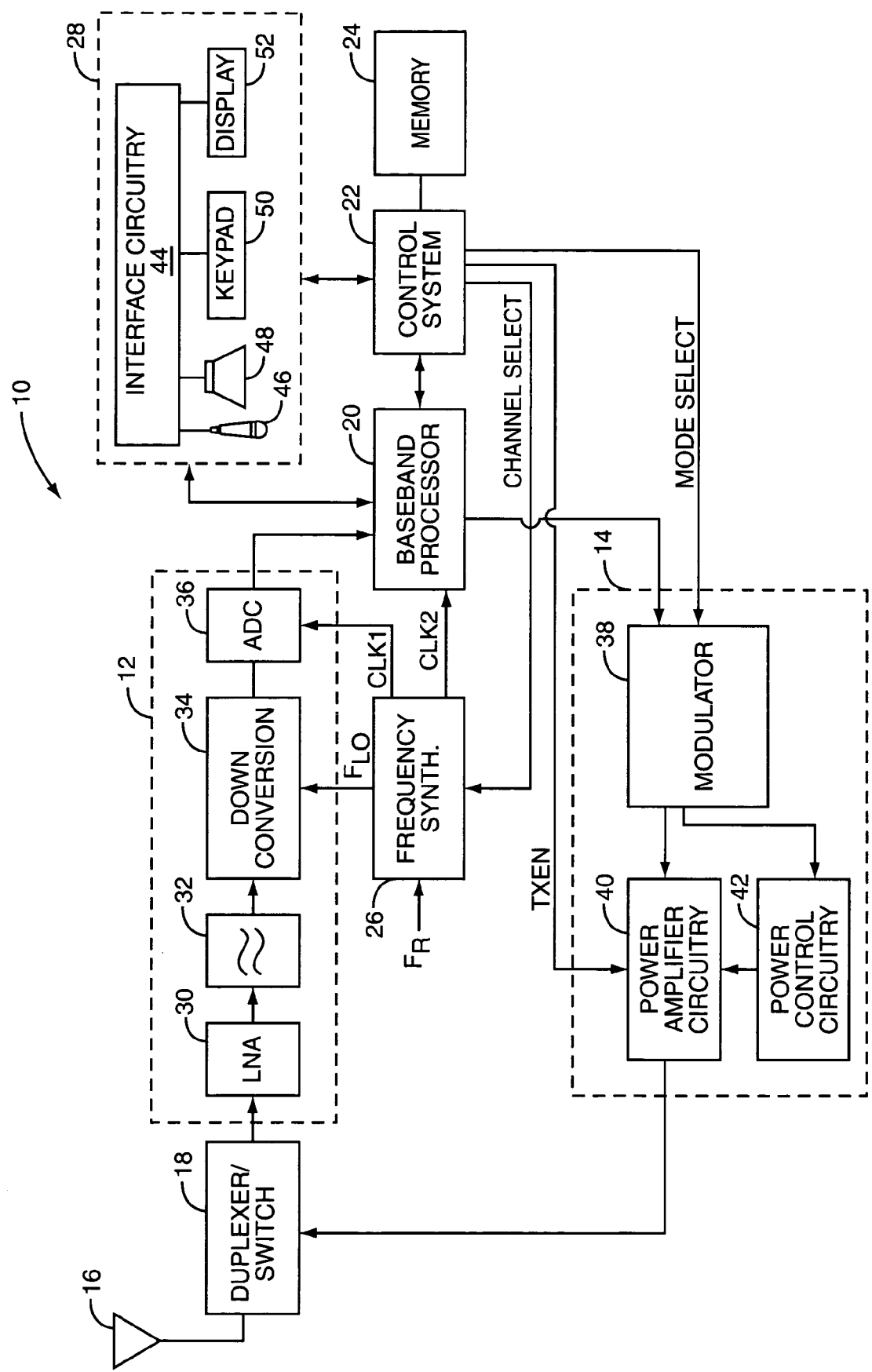
FIG. 1 illustrates an exemplary mobile terminal according to one embodiment of the present invention.

The present invention is preferably incorporated in a mobile terminal 10, such as a mobile telephone, personal digital assistant, or the like. The basic architecture of a mobile terminal 10 is represented in FIG. 1, and may include a receiver front end 12, a radio frequency transmitter section 14, an antenna 16, a duplexer or switch 18, a baseband processor 20, a control system 22, memory 24, a frequency synthesizer 26, and an interface 28. The receiver front end 12 receives information bearing radio frequency signals from one or more remote transmitters provided by a base station (not shown). A low noise amplifier 30 amplifies the signal. A filter circuit 32 minimizes broadband interference in the received signal, while downconversion circuitry 34 downconverts the filtered, received signal to an intermediate or baseband frequency signal, which is then digitized into one or more digital streams by an analog-to-digital converter (ADC) 36. The receiver front end 12, and particularly the downconversion circuitry 34, typically uses one or more local oscillator frequencies ($F_{LO}$), or mixing frequencies, generated by the frequency synthesizer 26.

According to the present invention, the frequency synthesizer 26 operates to provide clock signals (CLK1, CLK2) in addition to the local oscillator frequency signal ($F_{LO}$), as described below in more detail. The first clock signal (CLK1) is provided to the ADC 36, and the second clock signal (CLK2) is provided to the baseband processor 20. The second clock signal (CLK2) may also be provided to the control system 22. In essence, the frequency synthesizer 26 provides the local oscillator frequency signal ($F_{LO}$) and the clock signals (CLK1, CLK2) based on an output frequency signal of a phase lock loop in such a manner as to avoid self interference. This is especially beneficial when the receiver front end 12, which is substantially analog circuitry, and the baseband processor 20, which is digital circuitry, are incorporated into a single integrated circuit or semiconductor die.

The baseband processor 20 processes the digitized, received signal to extract the information or data bits conveyed in the received signal. This processing typically comprises demodulation, decoding, and error correction operations. As such, the baseband processor 20 is generally implemented in one or more digital signal processors (DSPs).

On the transmit side, the baseband processor 20 receives digitized data from the control system 22, which it encodes for transmission. The control system 22 may run software stored in the memory 24. Alternatively, the operation of the control system 22 may be a function of sequential logic structures as is well understood. After encoding the data from the control system 22, the baseband processor 20 outputs the encoded data to the radio frequency transmitter section 14.

A modulator 38 receives the data from the baseband processor 20 and operates according to one of two modulation schemes to provide a modulated signal to the power amplifier circuitry 40. The modulation scheme of the modulator 38 may be controlled by a mode select signal (MODE SELECT) from the control system 22. In one embodiment, the modulator 38 operates according to either an 8-Level Phase Shift Keying (8PSK) modulation scheme, which is a modulation scheme containing both amplitude and phase components, or a Gaussian Minimum Shift Keying (GMSK) modulation scheme, which is a constant amplitude modulation scheme. When in 8PSK mode, the modulator 38 provides a phase component (φ) at a desired transmit frequency to the power amplifier circuitry 40 and an amplitude component (r) to the power control circuitry 42. The power control circuitry 42 controls an output power of the power amplifier circuitry 40 based on the amplitude component (r) or, optionally, a combination of a ramping signal and the amplitude component (r), thereby providing amplitude modulation of the phase component (φ). When in GMSK mode, the modulator provides a phase modulated signal to the power amplifier circuitry 40 and the ramping signal to the power control circuitry 42, where the power control circuitry 42 controls the output power of the power amplifier circuitry 40 based on the ramping signal.

The power amplifier circuitry 40 amplifies the modulated signal from the modulator 38 to a level appropriate for transmission from the antenna 16. A gain of the power amplifier circuitry 40 is controlled by the power control circuitry 42. In essence, the power control circuitry 42 operates to control a supply voltage provided to the power amplifier circuitry 40 based on the amplitude component (r) or, optionally, a combination of the amplitude component (r) and the ramping signal from the modulator 38 when in the 8PSK mode and based on the ramping signal when in GMSK mode.

A user may interact with the mobile terminal 10 via the interface 28, which may include interface circuitry 44 associated with a microphone 46, a speaker 48, a keypad 50, and a display 52. The interface circuitry 44 typically includes analog-to-digital converters, digital-to-analog converters, amplifiers, and the like. Additionally, it may include a voice encoder/decoder, in which case it may communicate directly with the baseband processor 20.

The microphone 46 will typically convert audio input, such as the user's voice, into an electrical signal, which is then digitized and passed directly or indirectly to the baseband processor 20. Audio information encoded in the received signal is recovered by the baseband processor 20, and converted into an analog signal suitable for driving speaker 48 by the interface circuitry 44. The keypad 50 and display 52 enable the user to interact with the mobile terminal 10, input numbers to be dialed and address book information, or the like, as well as monitor call progress information.

Figure 2:
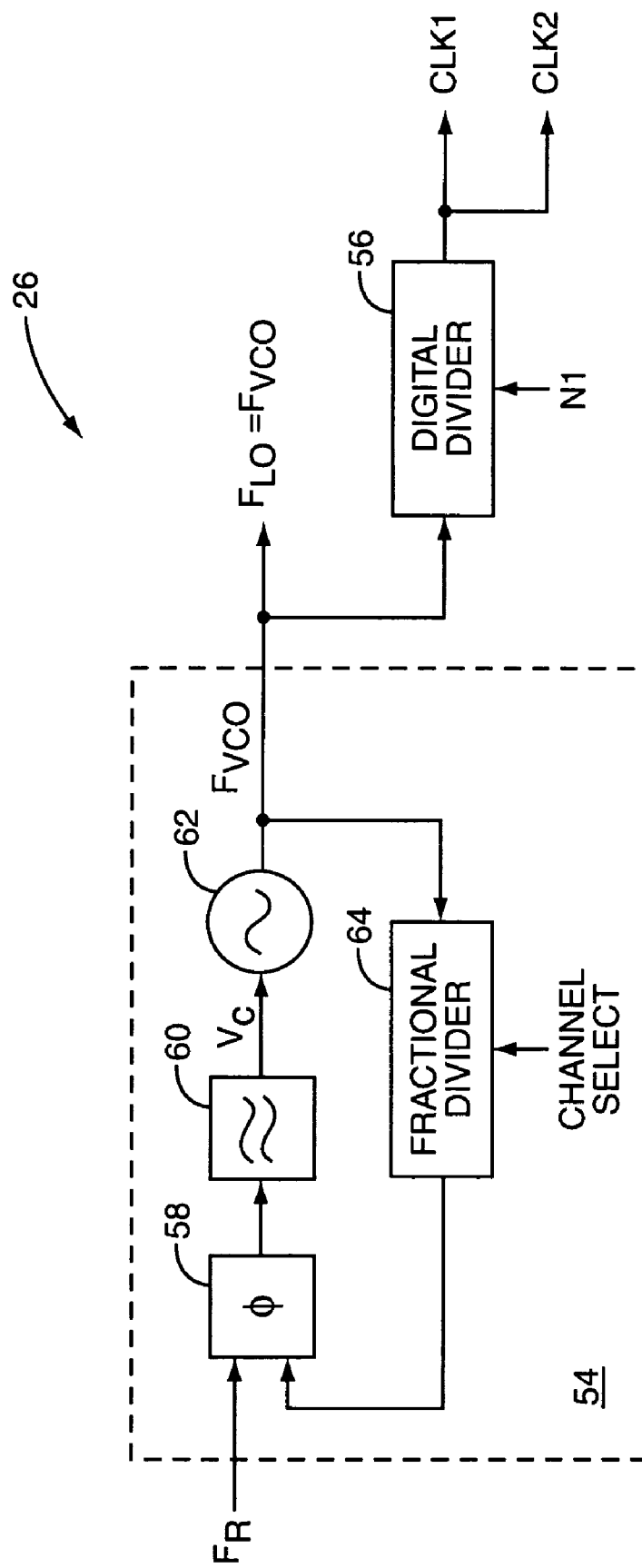
FIG. 2 illustrates a first exemplary embodiment of a frequency synthesizer providing a mixing signal and baseband clock signals according to one embodiment of the present invention.

FIG. 2 illustrates a first exemplary embodiment of the frequency synthesizer 26 of the present invention. The frequency synthesizer 26 includes a phase lock loop (PLL) 54 and a digital divider 56. As an example, the PLL 54 is illustrated as a fractional-N PLL including a phase detector 58, a loop filter 60, a voltage controlled oscillator (VCO) 62, and a fractional divider 64. The operation of the PLL 54 will be apparent to one of ordinary skill in the art upon reading this disclosure. In general, the phase detector 58 compares a phase of a divided VCO frequency signal to a phase of a reference frequency signal (FR). Based on the comparison, the phase detector 58 provides a comparison signal to the loop filter 60, which filters the comparison signal to provide a voltage control signal ($V_C$) to the VCO 62. Based on the voltage control signal ($V_C$), the VCO 62 provides an output frequency signal ($F_{VCO}$), which is divided by the fractional divider 64 based on a channel select signal to provide the divided VCO frequency signal. The channel select signal is a control signal that controls the fractional divide value of the fractional divider 64 and may be provided by the control system 22 (FIG. 1) in order to control the channel of the receiver front end 12 (FIG. 1) and/or the radio frequency transmitter section 14 (FIG. 1).

It should be noted that the PLL 54 is exemplary. The PLL 54 may be any type of frequency synthesizer such as an integer PLL, an Offset PLL (OPLL), or a Fractional-N Offset PLL (FN-OPLL) such as that described in commonly owned and assigned U.S. patent application Ser. No. 11/047,258 entitled "Fractional-N Offset Phase Lock Loop", filed on Jan. 31, 2005, which is hereby incorporated by reference in its entirety. It should also be noted that the PLL 54 may be a PLL associated with the radio frequency transmitter section 14 (FIG. 1).

According to this exemplary embodiment of the present invention, the output frequency signal ($F_{VCO}$) is provided to the downconversion circuitry 34 (FIG. 1) as the local oscillator frequency signal ($F_{LO}$). The digital divider 56 operates to divide the output frequency signal ($F_{VCO}$) based on a divide value (N1) to provide the clock signal (CLK1), which is a digital signal. In this embodiment, the clock signal (CLK1) is also provided as the second clock signal (CLK2). The divide value (N1) is preferably provided by the control system 22

(FIG. 1) and is an integer divide value. However, the divide value (N1) may alternatively be a fractional divide value.

The control system 22 provides the divide value (N1) such that all harmonics of the clock signals (CLK1, CLK2) are at least a minimum offset from a center frequency ($F_C$) of the radio frequency signal received by the receiver front end 12 (FIG. 1). The minimum offset is predetermined and is dependent on the particular implementation. In general, the minimum offset is a frequency offset that is larger than half the bandwidth of the received signal such that the harmonics do not overlap the spectrum of the received signal. As the offset increases past the minimum offset, rejection increases with offset. As discussed below in more detail, if the downconversion circuitry 34 (FIG. 1) operates according to a dual conversion scheme where the received signal is first downconverted to an intermediate frequency (IF) signal and then to a baseband signal, the divide value (N1) may be provided such that all harmonics of the clock signals (CLK1, CLK2) are at least a minimum offset from the center frequency ($F_C$) of the radio frequency signal and the IF signal.

In one embodiment, the divide value (N1) is a predetermined value that remains constant for all channels within the frequency range of the receiver front end 12 (FIG. 1). Accordingly, as the mobile terminal 10 changes from a first channel to a second channel, the divide value (N1) remains constant, but the output frequency signal ($F_{VCO}$) changes. Since the output frequency signal ($F_{VCO}$) changes, the frequencies of the clock signals (CLK1, CLK2) also change. Accordingly, the harmonics of the clock signals (CLK1, CLK2) are moved as the channel, and thus the center frequency of the received signal, changes in such a manner that the relationship between the harmonics and the center frequency is substantially unchanged. It should be noted that the change in the frequency of the clock signals (CLK1, CLK2) is scaled with respect to the change in the output frequency signal ($F_{VCO}$) due to the digital divider 56. Therefore, the relationship between the harmonics of the clock signals (CLK1, CLK2) and the center frequency changes slightly due to the scaling of the change in the frequency of the clock signals (CLK1, CLK2) with respect to the change in the output frequency signal ($F_{VCO}$). However, with a carefully laid out frequency plan, the relationship between the harmonics and the center frequency is substantially unchanged.

In another embodiment, the mobile terminal 10 (FIG. 1) may have a large frequency range. For example, the mobile terminal 10 may be capable of operating according to 802.11a or 802.11b. In this case, the frequency range of the mobile terminal 10 may be divided into a number of subsets with each subset having a corresponding value of the divide value (N1). Thus, the control system 22 may change the divide value (N1) based on the subset of the frequency range in which the desired channel falls. In this embodiment, the divide value (N1) may be constant for all channels within a particular subset. In other words, for each subset of the frequency range, the divide value (N1) may be constant for each channel within that particular subset.

Thus, as the mobile terminal 10 changes from a first channel to a second channel, both of which are in the same subset of the frequency range, the divide value (N1) remains constant, but the output frequency signal ($F_{VCO}$) changes. Since the output frequency signal ($F_{VCO}$) changes, the clock signals (CLK1, CLK2) also change. As stated above, the change in the frequency of the clock signals (CLK1, CLK2) is scaled with respect to the change in the output frequency signal ($F_{VCO}$) due to the digital divider 56. Accordingly, the harmonics of the clock signals (CLK1, CLK2) are moved as the channel, and thus the center frequency of the received signal, changes in such a manner that the relationship between the harmonics and the center frequency is substantially unchanged.

When the mobile terminal 10 changes from a first channel within a first subset of the frequency range to a second channel within a second subset of the frequency range, a value is provided for the divide value (N1) that corresponds to the second subset. It should be noted that the values for the divide value (N1) for each subset are preferably predetermined and may be stored in the memory 24 (FIG. 1).

Figure 3:
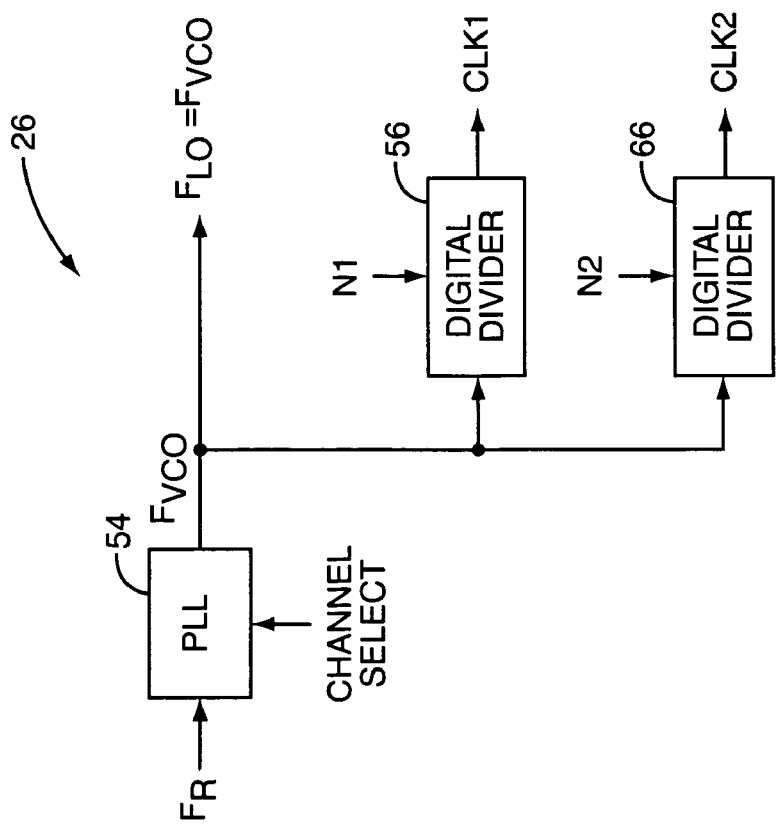
FIG. 3 illustrates a second exemplary embodiment of a frequency synthesizer providing a mixing signal and baseband clock signals according to one embodiment of the present invention.

FIG. 3 illustrates a second exemplary embodiment of the frequency synthesizer 26 of the present invention. Like the embodiment of FIG. 2, the frequency synthesizer 26 includes the PLL 54 and the digital divider 56. However, in this embodiment, the frequency synthesizer 26 also includes a digital divider 66 that operates to divide the output frequency signal ($F_{VCO}$) based on a divide value (N2) to provide the second clock signal (CLK2), which is a digital signal. The divide value (N2) is preferably provided by the control system 22 (FIG. 1) and is an integer divide value. However, the divide value (N2) may alternatively be a fractional divide value.

More particularly, according to this exemplary embodiment of the present invention, the output frequency signal ($F_{VCO}$) is provided to the downconversion circuitry 34 (FIG. 1) as the local oscillator frequency signal ($F_{LO}$). The digital divider 56 operates to divide the output frequency signal ($F_{VCO}$) based on the divide value (N1) to provide the clock signal (CLK1). The digital divider 66 operates to divide the output frequency signal ($F_{VCO}$) based on the divide value (N2) to provide the clock signal (CLK2).

The control system 22 provides the divide values (N1, N2) such that all harmonics of the clock signals (CLK1, CLK2) are at least a minimum offset from the center frequency ($F_C$) of the radio frequency signal received by the receiver front end 12 (FIG. 1). Further, as discussed below in more detail, if the downconversion circuitry 34 (FIG. 1) operates according to a dual conversion scheme where the received signal is first downconverted to an intermediate frequency (IF) signal and then to a baseband signal, the divide values (N1, N2) may be provided such that all harmonics of the clock signals (CLK1, CLK2) are at least a minimum offset from the center frequency ($F_C$) of the radio frequency signal and the IF signal.

In one embodiment, the divide values (N1, N2) are predetermined values that remain constant for all channels within the frequency range of the receiver front end 12 (FIG. 1). Accordingly, as the mobile terminal 10 changes from a first channel to a second channel, the divide values (N1, N2) remain constant, but the output frequency signal ($F_{VCO}$) changes. Since the output frequency signal ($F_{VCO}$) changes, the frequencies of the clock signals (CLK1, CLK2) also change. Accordingly, the harmonics of the clock signals (CLK1, CLK2) are moved as the channel, and thus the center frequency of the received signal, changes in such a manner that the relationship between the harmonics and the center frequency is substantially unchanged. It should be noted that the change in the frequency of the clock signal (CLK1) and the change in the frequency of the clock signal (CLK2) are scaled with respect to the change in the output frequency signal ($F_{VCO}$) due to the digital dividers 56 and 66. Therefore, the relationship between the harmonics of the clock signals (CLK1, CLK2) and the center frequency changes slightly due to the scaling of the change in the frequency of the clock signals (CLK1, CLK2) with respect to the change in the output frequency signal ($F_{VCO}$). However, with a carefully laid out frequency plan, the relationships between the harmonics of the clock signals (CLK1, CLK2) and the center frequency ($F_C$) are substantially unchanged.

In another embodiment, the mobile terminal 10 (FIG. 1) may have a large frequency range. For example, the mobile terminal 10 may be capable of operating according to 802.11a or 802.11b. In this case, the frequency range of the mobile terminal 10 may be divided into a number of subsets with each subset having corresponding values of the divide values (N1, N2). Thus, the control system 22 may change the divide values (N1, N2) based on the subset of the frequency range in which the desired channel falls. In this embodiment, the divide values (N1, N2) may be constant for all channels within a particular subset. In other words, for each subset of the frequency range, the divide values (N1, N2) may be constant for each channel within that particular subset.

Thus, as the mobile terminal 10 changes from a first channel to a second channel, both of which are in the same subset of the frequency range, the divide values (N1, N2) remain constant, but the output frequency signal ($F_{VCO}$) changes. Since the output frequency signal ($F_{VCO}$) changes, the clock signals (CLK1, CLK2) also change. As stated above, the change in the frequency of the clock signals (CLK1, CLK2) are each scaled with respect to the change in the output frequency signal ($F_{VCO}$) due to the digital dividers 56 and 66. Accordingly, the harmonics of the clock signals (CLK1, CLK2) are moved as the center frequency of the received signal changes in such a manner that the relationship between the harmonics and the center frequency is substantially unchanged.

When the mobile terminal 10 changes from a first channel within a first subset of the frequency range to a second channel within a second subset of the frequency range, a value is provided for the divide value (N1) that corresponds to the second subset. It should be noted that the values for the divide value (N1) for each subset are preferably predetermined and may be stored in the memory 24 (FIG. 1).

Figure 4:
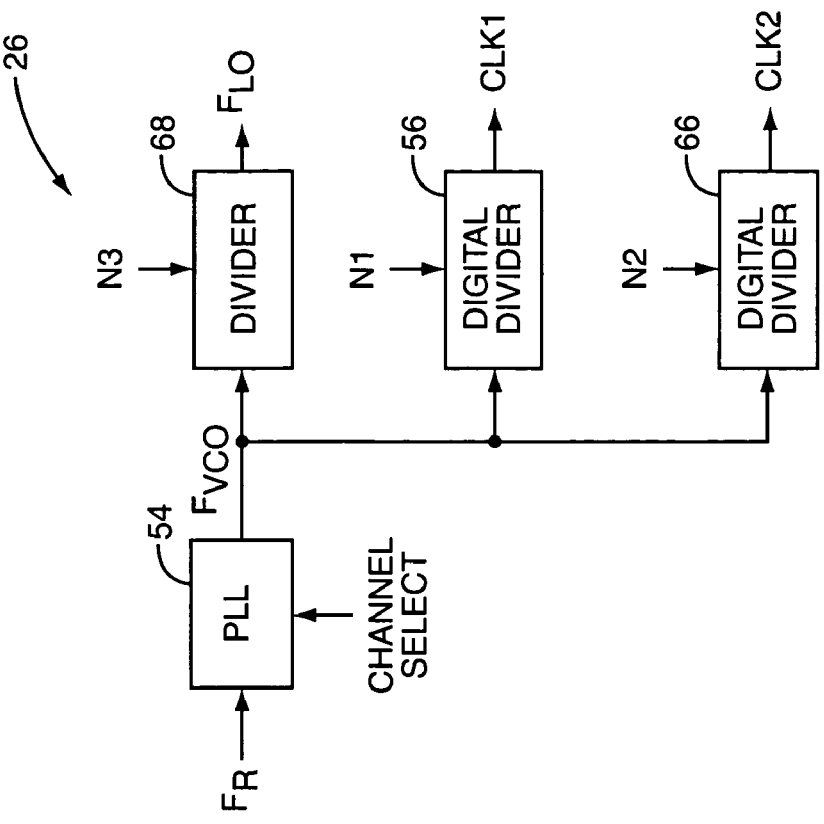
FIG. 4 illustrates a third exemplary embodiment of a frequency synthesizer providing a mixing signal and baseband clock signals according to one embodiment of the present invention.

FIG. 4 illustrates another exemplary embodiment of the frequency synthesizer 26 of the present invention. This embodiment is similar to the embodiment of FIG. 3. Accordingly, the details of the PLL 54 and the digital dividers 56 and 66 will not be repeated for conciseness. However, in this embodiment, a divider 68 operates to divide the output frequency signal ($F_{VCO}$) by a divide value (N3) to provide the local oscillator frequency signal ($F_{LO}$). In one embodiment, the divide value (N3) is a constant divide value. In another embodiment, the divide value (N3) is a variable divide value and may be provided by the control system 22 (FIG. 1). It should also be noted that the divider 68 may be either an integer divider or a fractional divider.

Figure 5:
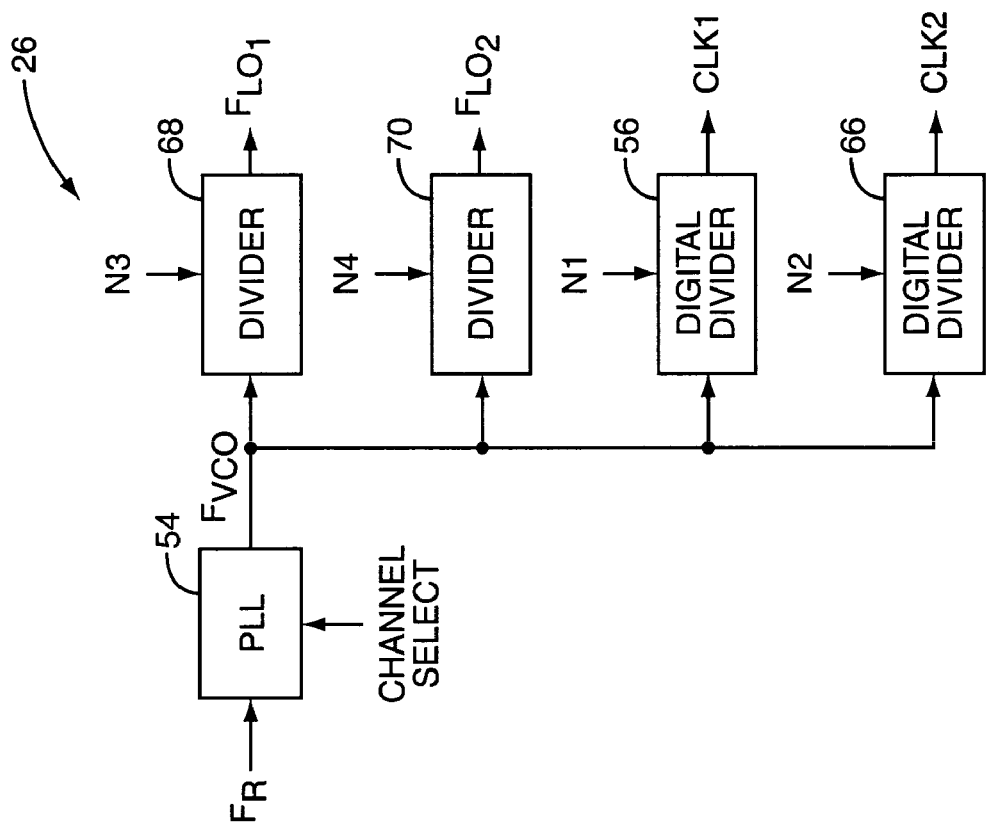
FIG. 5 illustrates a fourth exemplary embodiment of a frequency synthesizer providing mixing signals and baseband clock signals according to one embodiment of the present invention.

FIG. 5 illustrates yet another exemplary embodiment of the frequency synthesizer 26 of the present invention. This embodiment is substantially the same as the embodiment of FIG. 4. The details of the PLL 54 and the digital dividers 56 and 66 will not be repeated for conciseness. However, in this embodiment, the downconversion circuitry 34 (FIG. 1) operates according to a dual conversion scheme where the received signal is downconverted from an RF signal to an IF signal using a first local oscillator frequency signal ($F_{LO1}$), and the IF signal is downconverted to either a baseband signal or a very low intermediate frequency (VLIF) signal using a second local oscillator frequency signal ($F_{LO}$).

To provide the first and second local oscillator frequencies ($F_{LO1}$, $F_{LO2}$), the frequency synthesizer 26 includes the divider 68 and a divider 70. The divider 68 operates to provide the first local oscillator frequency signal ($F_{LO1}$) by dividing the output frequency signal ($F_{VCO}$) by the divide value (N3), and the divider 70 operates to provide the second local oscillator frequency signal ($F_{LO2}$) by dividing the output frequency signal ($F_{VCO}$) by the divide value (N4). In one embodiment, the divide values (N3, N4) are constant divide values. In another embodiment, the divide values (N3, N4) are variable divide values and may be provided by the control system 22 (FIG. 1). It should also be noted that the dividers 68 and 70 may be either integer or fractional dividers.

FIGS. 6A and 6B are tables illustrating an exemplary frequency plan for the frequency synthesizer of FIG. 5 when the mobile terminal 10 is a mobile terminal operating in the 2.4 GHz band according to 802.11b. In FIG. 6A, the first column illustrates multiple values of the center frequency ($F_C$) of the received signal. Each of the values of the center frequency ($F_C$) corresponds to a center frequency of a channel within the 2.4 GHz frequency band. The second column illustrates frequencies of the output frequency signal ($F_{VCO}$) corresponding to each value of the center frequency ($F_C$). The third column illustrates frequencies of the first local oscillator frequency signal ($F_{LO1}$), where the divide value (N3) is 1. The fourth column illustrates values of a frequency ($F_{IF}$) of the IF signal within the downconversion circuitry 34 (FIG. 1) when operating according to a dual conversion scheme. The fifth column illustrates frequencies of the second local oscillator frequency signal ($F_{LO2}$), where the divide value (N4) is 3. Note that in this embodiment, the frequency of the second local oscillator frequency signal ($F_{LO2}$) is equal to the frequency ($F_{IF}$) of the IF signal. Thus, the downconversion circuitry 34 provides the downconverted signal at baseband. The sixth column illustrates values of the first clock signal (CLK1), where the divide value (N1) is equal to 7. The seventh column illustrates values of the second clock signal (CLK2), where the divide value (N2) is equal to 89.

FIG. 6B illustrates the closest harmonics of the clock signals (CLK1, CLK2) to the frequency ($F_{IF}$) of the IF signal, which is equal to the frequency of the second local oscillator frequency signal ($F_{LO2}$), and the center frequency ($F_C$). FIG. 6B also illustrates a frequency offset of the closest harmonic to either the frequency ($F_{IF}$) of the IF signal or the center frequency ($F_C$). As illustrated, the frequency offset of the closet harmonics of both of the clock signals (CLK1, CLK2) remain substantially unchanged as the channel, or center frequency ($F_C$), is changed.

To illustrate the benefit of the present invention, consider the case where the clock signal (CLK2) is fixed at 40.7 MHz. Accordingly, the harmonics of the clock signal (CLK2) are 40.7 MHz, ..., 1178.9 MHz, 1219.6 MHz, ..., 2398.4 MHz, 2439.1 MHz, etc. Accordingly, when the mobile terminal 10 (FIG. 1) is tuned to the channel corresponding to the center frequency ($F_C$) of 2432.0 MHz, the 30th harmonic at 1219.6 MHz and the 60th harmonic at 2439.1 MHz are near the frequency ($F_{IF}$) (1216.0 MHz) and the center frequency ($F_C$) (2432.0 MHz), respectively. More specifically, the frequency offset between the 30th harmonic and the frequency ($F_{IF}$) of the IF signal is approximately 3.6 MHz, and the frequency offset between the 60th harmonic and the center frequency ($F_C$) is approximately 7.1 MHz. However, using the frequency synthesizer 26 (FIG. 5) of the present invention, these frequency offsets are approximately 13.7 MHz and 27.3 MHz, respectively. Further, by generating the clock signals (CLK1,CLK2) based on the output frequency signal ($F_{VCO}$), the relationship between the harmonics of the clock signals (CLK1, CLK2) remains substantially unchanged for all frequency channels.

Although the divide values (N1, N2) are constant for all of the frequency channels in FIGS. 6A and 6B, it should be noted that in other embodiments where the frequency range is larger, such as the 5 GHz frequency band of 802.11a, the frequency range may be divided into a number of subsets, where the divide values (N1, N2) may be different for each subset of the frequency range. An exemplary frequency plan for the 5 GHz frequency band is illustrated in FIGS. 7A and 7B, which are similar to FIGS. 6A and 6B. However, in this exemplary embodiment, the frequency band (4920 MHz-5920 MHz) is divided into four subsets. For each of the subsets, the divide values N1-N4 may be different. As illustrated in FIG. 7A, in the first subset, N1=7, N2=89, N3=1, and N4=3. In the second subset, N1=7, N2=95, N3=1, and N4=3. In the third subset, N1=8, N2=101, N3=1, and N4=3. In the fourth subset, N1=8, N2=106, N3=1, and N4=3.

FIG. 7B illustrates the closest harmonics of the clock signals (CLK1, CLK2) to the frequency ($F_{IF}$) of the IF signal, which is equal to the frequency of the second local oscillator frequency signal ($F_{LO2}$), and the center frequency ($F_C$). FIG. 7B also illustrates a frequency offset of the closest harmonic to either the frequency ($F_{IF}$) of the IF signal or the center frequency ($F_C$). As illustrated, the frequency offset of the closet harmonics of both of the clock signals (CLK1, CLK2) remain substantially unchanged as the channel, or center frequency ($F_C$), is changed.

In operation, when the mobile terminal 10 (FIG. 1) is tuned to a particular channel within the frequency band, the values for the divide values (N1-N4) which correspond to the subset within which the channel falls are provided to the frequency synthesizer 26. Thus, for example, if the mobile terminal 10 is tuned to the channel having the center frequency ($F_C$) of 4980 MHz, then the values of the divide values (N1-N4) are the divide values for subset 1. It should also be noted that the divide values (N1-N4) may also change when switching between 802.11a operation, which is in the 5 GHz frequency band, and 802.11b operation, which is in the 2.4 GHz frequency band.

The present invention provides substantial opportunity for variation without departing from the spirit or scope of the present invention. For example, the above description states that the divide values (N1-N4) may be provided by the control system 22 (FIG. 1). However, it should be understood that there are various manners in which the divide values (N1-N4) may be generated. For example, the divide values (N3, N4) may be fixed within the dividers 68 and 70 such that they cannot be changed. Further, the frequency synthesizer 26 may include circuitry for generating the divide values (N1, N2) based on the channel select signal from the control system 22. For example, the frequency synthesizer 26 may include a look-up table and associated control circuitry, where the look-up table stores the values for divide values (N1-N4) or any subset thereof for each subset, and the control circuitry selects values from the look-up table based on the channel select signal from the control system 22. Many other techniques for providing the divide values will be apparent to one of ordinary skill in the art upon reading this disclosure.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   a receiver comprising downconversion circuitry adapted to convert a radio frequency (RF) signal into a downconverted signal using at least one local oscillator frequency signal;
   digital circuitry operating based on at least one clock signal and adapted to process the downconverted signal;
   a frequency synthesizer adapted to provide an output frequency signal based on a reference frequency and a control signal, wherein the at least one local oscillator frequency signal is a function of the output frequency signal; and
   divider circuitry adapted to divide the output frequency signal to provide the at least one clock signal based on at least one divide value provided such that at least one harmonic of the at least one clock signal is offset from a center frequency of the RF signal by at least a minimum frequency offset, and the at least one harmonic of the at least one clock signal nearest to the center frequency of the RF signal is substantially unchanged as the receiver is tuned from a first frequency channel to a second frequency channel by controlling the output frequency signal of the frequency synthesizer using the control signal.

2. The system of claim 1 wherein the minimum frequency offset is approximately equal to half a bandwidth of the RF signal.

3. The system of claim 1 wherein the at least one divide value is a constant divide value.

4. The system of claim 1 wherein when the receiver is tuned to a frequency channel within a frequency range of the receiver via the frequency synthesizer, the frequency range having a plurality of subsets each associated with a corresponding value for the at least one divide value, the at least one divide value is provided by a control system by providing the value for the at least one divide value corresponding to a one of the plurality of subsets including the frequency channel.

5. The system of claim 1 wherein the frequency synthesizer comprises one of a group consisting of: a phase lock loop (PLL), an Offset PLL (OPLL), and a Fractional-N Offset PLL (FN-OPLL).

6. A system comprising:
   a receiver comprising downconversion circuitry adapted to convert a radio frequency (RF) signal into a downconverted signal using at least one local oscillator frequency signal;
   digital circuitry comprising:
      analog-to-digital conversion circuitry clocked by a first one of at least one clock signal and adapted to convert the downconverted signal to a digital signal; and
      processing circuitry clocked by a second one of the at least one clock signal and adapted to process the digital signal;
   a frequency synthesizer adapted to provide an output frequency signal based on a reference frequency and a control signal, wherein the at least one local oscillator frequency signal is a function of the output frequency signal; and
   divider circuitry adapted to divide the output frequency signal to provide the at least one clock signal.

7. The system of claim 6 wherein the divider circuitry comprises a first divider adapted to divide the output frequency signal based on a first divide value to provide the first and the second ones of the at least one clock signal.

8. The system of claim 6 wherein the divider circuitry comprises a first divider adapted to divide the output frequency signal based on a first divide value to provide the first one of the at least one clock signal and a second divider adapted to divide the output frequency signal based on a second divide value to provide the second one of the at least one clock signal.

9. The system of claim 8 wherein the divider circuitry further comprises a third divider adapted divide the output frequency signal based on a third divide value to provide the at least one local oscillator frequency signal.

10. The system of claim 8 wherein the downconversion circuitry operates to convert the RF signal to an intermediate frequency (IF) signal based on a first one of the at least one local oscillator frequency signal and to convert the IF signal to the downconverted signal based on a second one of the at least one local oscillator frequency signal, and the divider circuitry further comprises:
a third divider adapted to divide the output frequency signal based on a third divide value to provide the first one of the at least one local oscillator frequency signal; and
a fourth divider adapted to divide the output frequency signal based on a fourth divide value to provide the second one of the at least one local oscillator frequency signal.

11. A method comprising:
downconverting a radio frequency (RF) signal to a downconverted signal using at least one local oscillator frequency signal;
processing the downconverted signal using digital circuitry operating based on at least one clock signal;
providing an output frequency signal based on a reference frequency and a control signal using a frequency synthesizer;
providing the at least one local oscillator frequency signal as a function of the output frequency signal; and
dividing the output frequency signal to provide the at least one clock signal based on at least one divide value, such that a relationship between harmonics of the at least one clock signal nearest to a center frequency of the RF signal is substantially unchanged as the output frequency signal changes from a first frequency associated with a first frequency channel to a second frequency associated with a second frequency channel.

12. The method of claim 11 wherein the at least one divide value is provided such that the harmonics of the at least one clock signal are offset from the center frequency of the RF signal by at least a minimum frequency offset.

13. The method of claim 12 wherein the minimum frequency offset is approximately equal to half a bandwidth of the RF signal.

14. The method of claim 11 wherein the at least one divide value is a constant divide value.

15. The method of claim 11 further comprising providing the control signal to select a frequency channel within an associated frequency range having a plurality of subsets each associated with a corresponding value for the at least one divide value, wherein providing the at least one divide value comprises providing the value for the at least one divide value corresponding to a one of the plurality of subsets including the frequency channel.

16. The method of claim 11 wherein the frequency synthesizer comprises one of a group consisting of: a phase lock loop (PLL), an Offset PLL (OPLL), and a Fractional-N Offset PLL (FN-OPLL).

17. A method comprising:
downconverting a radio frequency (RF) signal to a downconverted signal using at least one local oscillator frequency signal;
processing the downconverted signal using digital circuitry operating based on at least one clock signal by:
digitizing the downconverted signal using analog-to-digital conversion circuitry clocked by a first one of the at least one clock signal to provide a digital signal; and
processing the digital signal using processing circuitry clocked by a second one of the at least one clock signal;
providing an output frequency signal based on a reference frequency and a control signal using a frequency synthesizer;
providing the at least one local oscillator frequency signal as a function of the output frequency signal; and
dividing the output frequency signal to provide the at least one clock signal.

18. The method of claim 17 wherein dividing the output frequency signal to provide the at least one clock signal comprises dividing the output frequency signal based on a first divide value to provide the first and the second ones of the at least one clock signal.

19. The method of claim 17 wherein dividing the output frequency signal to provide the at least one clock signal comprises dividing the output frequency signal based on a first divide value to provide the first one of the at least one clock signal and dividing the output frequency signal based on a second divide value to provide the second one of the at least one clock signal.

20. The method of claim 19 wherein providing the at least one local oscillator frequency signal as the function of the output frequency signal comprises dividing the output frequency signal based on a third divide value to provide the at least one local oscillator frequency signal.

21. The method of claim 19 wherein downconverting the RF signal comprises downconverting the RF signal to an intermediate frequency (IF) signal based on a first one of the at least one local oscillator frequency signal and downconverting the IF signal to the downconverted signal based on a second one of the at least one local oscillator frequency signal, and providing the at least one local oscillator frequency signal as the function of the output frequency signal comprises dividing the output frequency signal based on a third divide value to provide the first one of the at least one local oscillator frequency signal and dividing the output frequency signal based on a fourth divide value to provide the second one of the at least one local oscillator frequency signal.

* * * * *